United States Patent [19]

Friedman

[11] Patent Number: 4,691,857

[45] Date of Patent: Sep. 8, 1987

[54] METHOD OF SHAPING A WORKPIECE

[75] Inventor: Gerald Friedman, Cleveland Heights, Ohio

[73] Assignee: TRW Inc., Cleveland, Ohio

[21] Appl. No.: 796,322

[22] Filed: Nov. 7, 1985

[51] Int. Cl.[4] ............................................. B23K 20/14
[52] U.S. Cl. ................................... 228/265; 228/190; 228/243; 29/421 R; 72/63
[58] Field of Search .......................... 72/63; 29/421 R; 228/173.2, 265, 243, 157, 190

[56] References Cited

U.S. PATENT DOCUMENTS

| | | | |
|---|---|---|---|
| 3,927,817 | 12/1975 | Hamilton et al. | 228/157 |
| 3,934,441 | 1/1976 | Hamilton et al. | 72/60 |
| 4,117,970 | 10/1978 | Hamilton et al. | 228/173.2 |
| 4,301,584 | 11/1981 | Dillner | 72/63 |
| 4,406,393 | 9/1983 | Ascani, Jr. et al. | 228/157 |
| 4,429,824 | 2/1984 | Woodward | 228/157 |
| 4,472,866 | 9/1984 | Moracz et al. | 228/190 X |

*Primary Examiner*—Kenneth J. Ramsey
*Attorney, Agent, or Firm*—Tarolli, Sundheim & Covell

[57] ABSTRACT

A method of bonding and shaping a plurality of pieces of material disposed in a fluid tight container includes providing a housing having components with different coefficients of thermal expansion. The container is positioned between upper and lower sections of the housing. The housing is then enclosed in an autoclave. The fluid in the autoclave and housing is heated with a resulting increase in the fluid pressure in the autoclave and housing. As the temperature and pressure in the housing is increased, the joint between the container and the housing sections is sealed by pressing the upper and lower sections of the housing against the container under the influence of forces resulting from different amounts of of thermal expansion of components of the housing. Thereafter, the fluid pressure in the autoclave is increased. Since the joint between the housing and the container has been sealed, the further increase in fluid pressure is applied to only the upper side of the container. This forces the container downwardly against a forming surface having a configuration corresponding to a desired configuration of the pieces of material.

6 Claims, 3 Drawing Figures

METHOD OF SHAPING A WORKPIECE

BACKGROUND OF THE INVENTION

The present invention relates to a new and improved method of shaping a workpiece and more specifically to a method of bonding pieces of material together and then shaping the the pieces of material to a desired configuration.

U.S. Pat. No. 3,920,175 discloses a method of shaping and bonding pieces of material by placing a metal blank or workpiece between upper and lower sections of a housing or tool frame. The two sections of the housing are pressed into tight sealing engagement with the rim of the blank by a pair of press plattens to seal a joint between the blank and the housing sections. The housing and workpiece are then heated and the fluid pressure in a chamber formed between the upper section of the housing and the upper side of the blank is increased. This results in deformation of the blank downwardly into abutting engagement with the pieces of metal in the lower section of the housing. The blank and pieces of metal in the lower section of the housing are diffusion bonded together under the influence of heat and pressure.

In U.S. Pat. No. 3,920,175 the blank or workpiece which is clamped between the two housing sections is a single sheet of material. In U.S. Pat. No. 4,472,866, the workpiece is a plurality of layers or plies of titanium. The flat plies of titanium are formed into a stack and are then enclosed in a can or container formed by two sheets of titanium. The container is evacuated and welded shut. The container, with the plies therein, is then placed in an autoclave or hot isostatic pressing apparatus. The temperature and pressure in the autoclave are sufficient to diffusion bond the plies together. After bonding, the workpiece is removed from the autoclave and transferred to a hydraulic press having upper and lower dies which are used to curve or shape the workpiece to a desired configuration.

BRIEF SUMMARY OF THE PRESENT INVENTION

The present invention provides a new and improved method of shaping a workpiece to a desired configuration. The workpiece is placed between sections of a housing having components with different coefficients of thermal expansion. A fluid tight seal is formed between the housing sections and the workpiece by heating the housing. As the housing is heated, components of the housing having different coefficients of thermal expansion cause the sections of the housing to be firmly pressed against the workpiece to seal the joint between the workpiece and housing sections. A fluid pressure differential is then established across the workpiece to press the workpiece against a forming surface having a shape corresponding to a desired shape of the workpiece.

In one specific way of practicing the invention, the housing and workpiece are positioned in a main chamber of an autoclave or hot isostatic pressing apparatus. The pressure applied against opposite sides of the workpiece is increased by heating the fluid in the autoclave and the housing. As the housing is heated, the different coeffiicents of thermal expansion of components of the housing cause the joint between the workpiece and housing sections to be sealed. The fluid pressure applied against one side of the workpiece is then increased by increasing the fluid pressure in the main chamber of the autoclave and conducting the increased fluid pressure through an orifice in one of the housing sections. The workpiece may be a single piece of material or a plurality of pieces of material which are bonded together under the influence of heat and pressure.

Accordingly, it is an object of this invention to provide a new and improved method of shaping a workpiece to a desired configuration and wherein a fluid tight seal is formed between the workpiece and a housing by thermally expanding components of the housing to different extents.

Another object of this invention is to provide a new and improved method of shaping a plurality of pieces of material by enclosing pieces of the material in a fluid tight container, applying heat and fluid pressure against opposite sides of the container to bond the pieces of material together, sealing a joint between the container and a housing by heating the housing and thermally expanding components of the housing to different extents, and thereafter, increasing the fluid pressure to which the one side of the container is exposed to press the container downwardly against a forming surface.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

General Description

Figure 1:
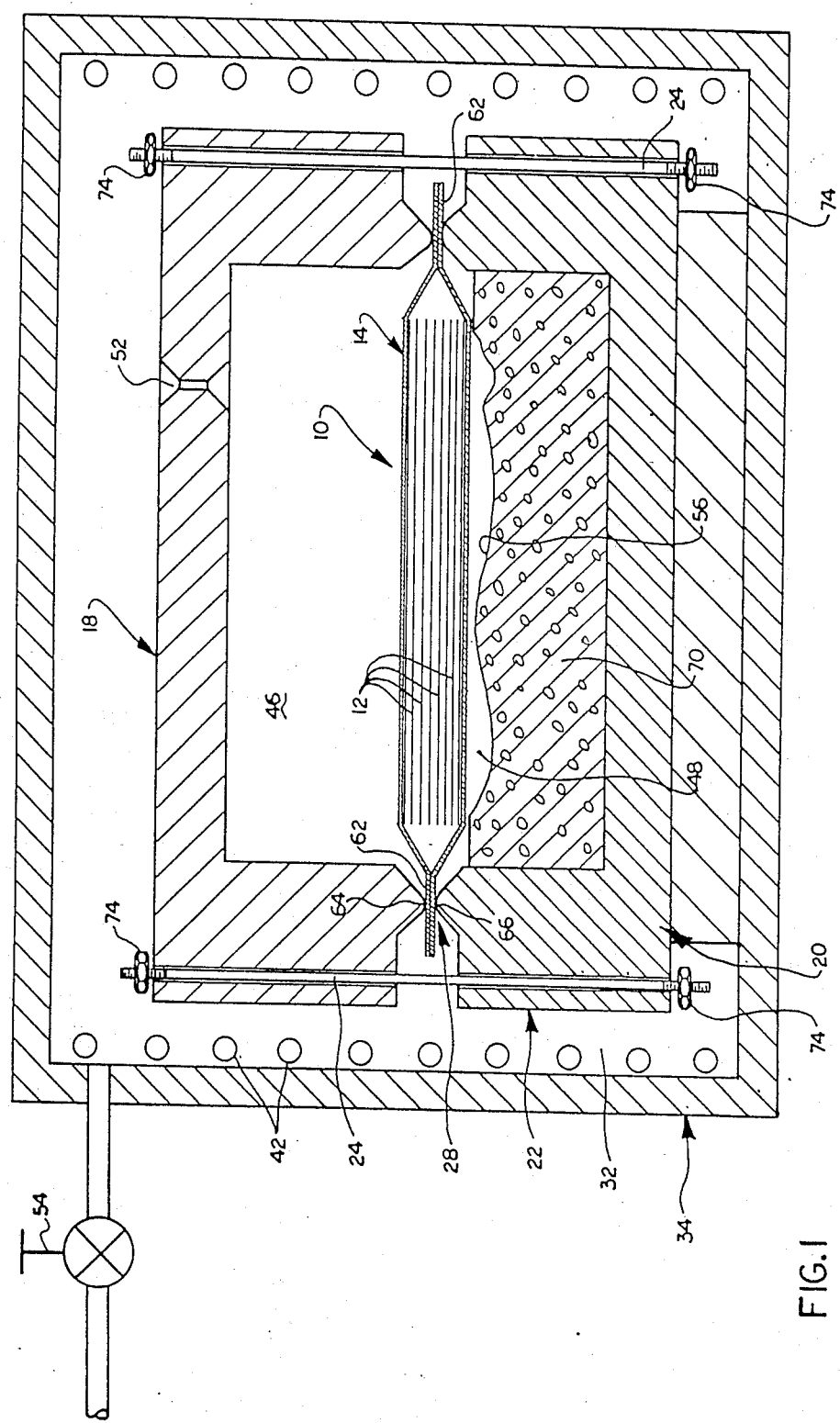
FIG. 1 is a schematic illustration depicting the relationship between a workpiece, sections of a housing and an autoclave prior to bonding and shaping of the workpiece.

The present invention relates to a method of shaping a workpiece 10 (FIG. 1) to a desired configuration. Although the workpiece 10 could be a single piece of material, in the present instance, the workpiece 10 includes a plurality of sheets or plies 12 which are enclosed within a fluid tight container 14. The plies 12 are to be diffusion bonded together and then shaped to a desired configuration.

The workpiece 10 is placed between upper and lower sections 18 and 20 of a housing 22. The rectangular housing sections 18 and 20 are interconnected by a plurality of tie rods 24. Although only a pair of tie rods 24 have been shown in FIG. 1, it should be understood that the housing 22 includes a series of tie rods disposed along each of the sides of the rectangular housing sections 18 and 20. The housing sections 18 and 20 are formed of a material having a relatively high coefficient of thermal expansion. The tie rods 24 are formed of a material having a relatively low coefficient of thermal expansion.

Figure 2:
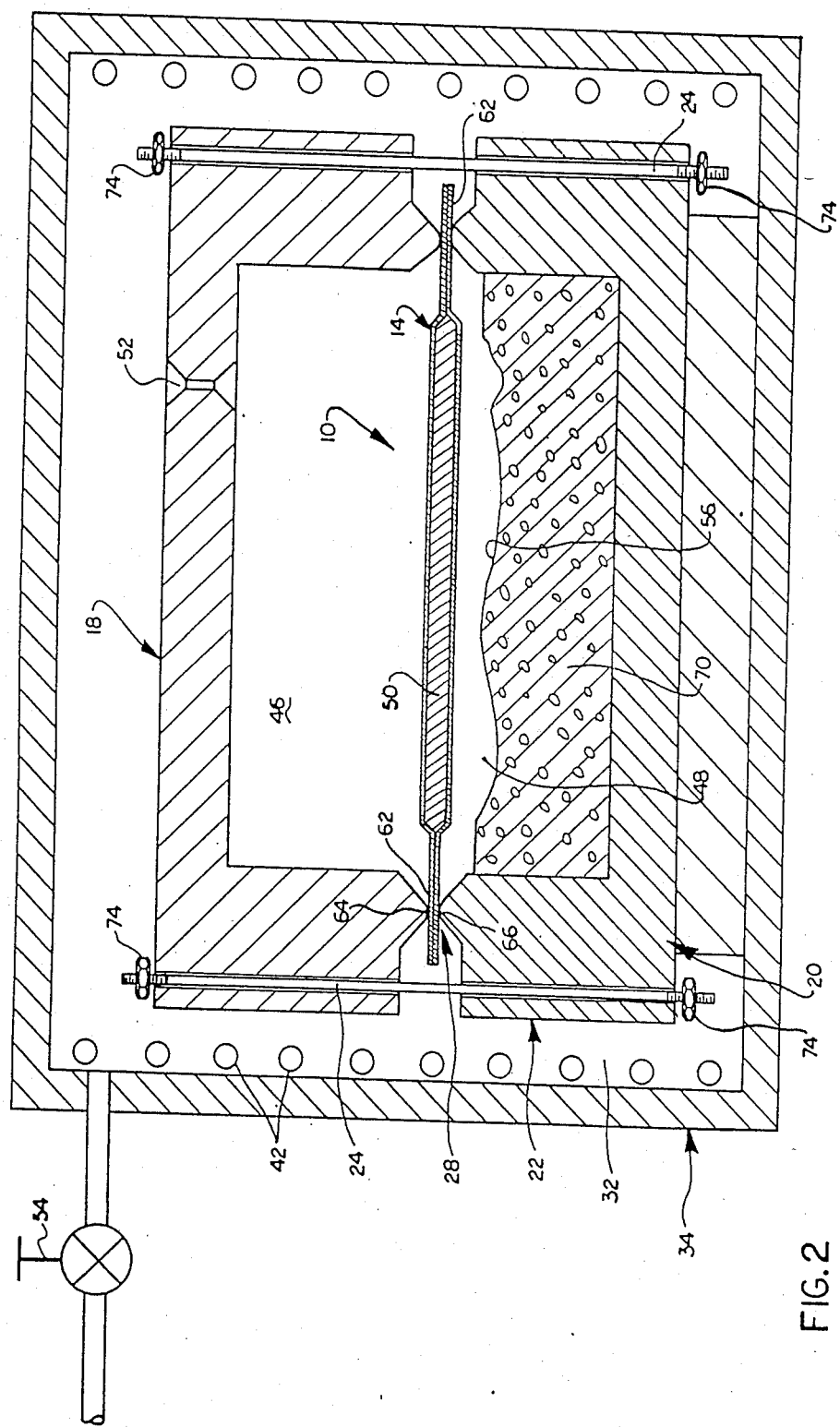
FIG. 2 is a schematic illustration depicting the relationship between the workpiece and the housing after parts of the workpiece have been diffusion bonded together by heat and pressure applied against opposite sides of the workpiece.

The housing 22 is placed in the main chamber 32 of an autoclave or hot isostatic pressing apparatus 34. At this time, the tie rods 24 are loosely connected so that a joint 28 between the upper and lower housing sections 18 and 20 and the workpiece 10 is not sealed. After the autoclave 34 has been closed, the fluid pressure in the main chamber 32 is increased along with the fluid pressure on opposite sides of the workpiece 10. The fluid pressure on opposite sides of the workpiece 10 causes the container 14 to collapse and press the plies 12 firmly together (see FIG. 2).

One way of increasing the fluid pressure in the autoclave 34 and housing 22 is by energizing a suitable heating coil 42 to heat the fluid (gas) in the autoclave 34 and housing 22. As the housing 22 is heated, the upper and lower sections 18 and 20 of the housing expand to a greater extent than the tie rods 24. This results in the two housing sections 18 and 20 being firmly clamped against the workpiece 10 to seal the joint 28 between the housing sections and the workpiece. The joint 28 extends completely around the workpiece so that the workpiece divides the housing into an upper chamber 46 and a lower chamber 48.

Once the joint 28 is sealed, fluid communication between the lower chamber 48 and the main chamber 32 of the autoclave is blocked. However, the upper chamber 46 is connected in fluid communication with the main chamber 32 of the autoclave 34 through an orifice 52. Since the pressure in the main chamber 32 of the autoclave and housing chambers 46 and 48 was raised by heating the fluid (gas) in these chambers, opposite sides of the workpiece 10 are subjected to relatively high and equal fluid pressures. The heat and pressure causes diffusion bonding of the layers or plies 12 together to form a unitary blank 50 (FIG. 2) with a skin formed by the container 14.

In accordance with a feature of the present invention, the workpiece 10 is formed to a desired shape while it is in the autoclave 34. This is accomplished by opening a valve 54 to further increase the pressure in the main chamber 32 of the autoclave 34. The increased fluid pressure in the main chamber 32 of the autoclave is conducted through an orifice 52 formed in the upper housing section 18 to establish, in a controlled manner, a fluid pressure differential between the upper and lower housing chambers 46 and 48.

Figure 3:
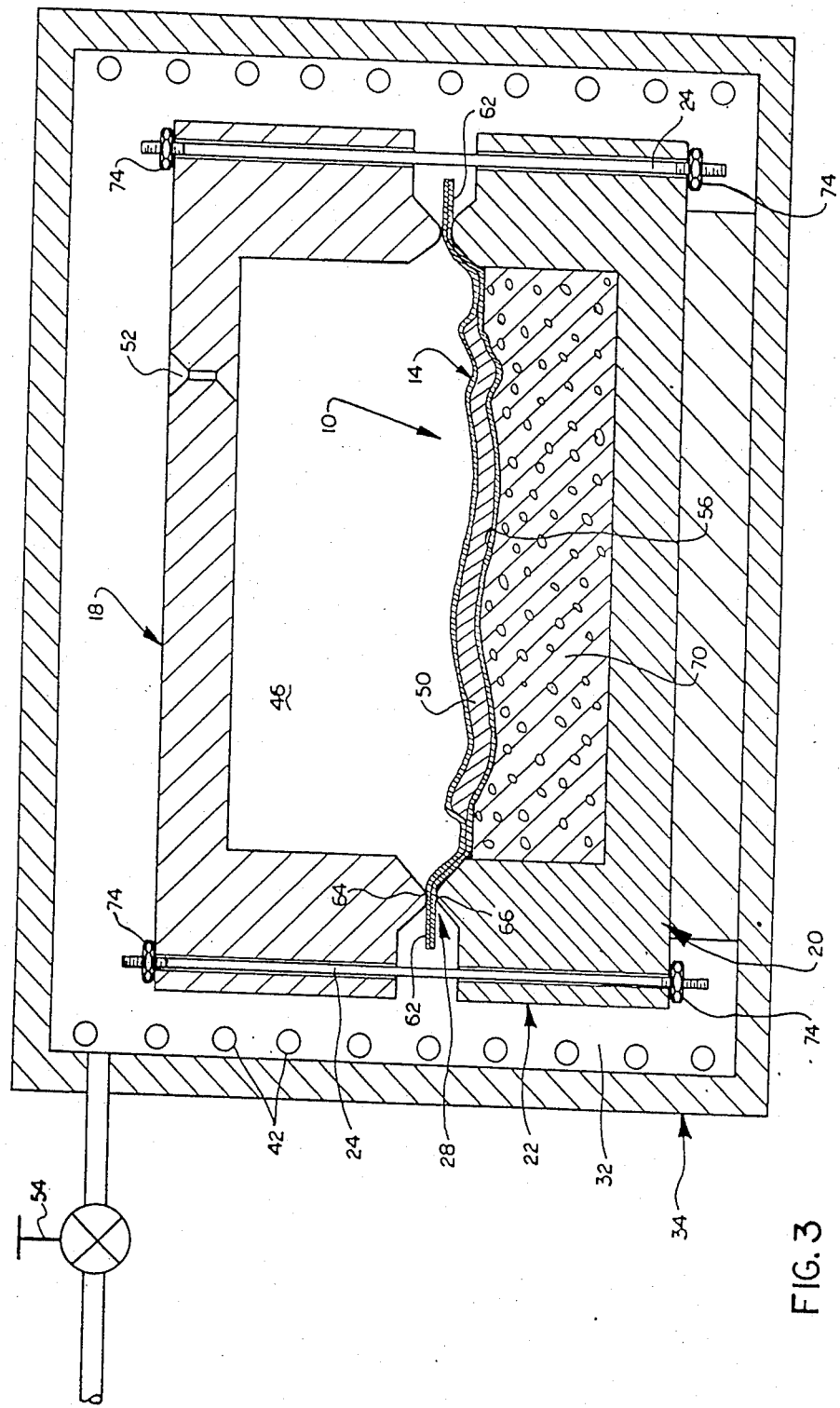
FIG. 3 is a schematic illustration depicting the relationship between the workpiece and the housing after the workpiece has been pressed against a forming surface to impart a desired shape to the workpiece.

Since the joint 28 is firmly sealed, the fluid pressure in the lower chamber 48 remains substantially constant while the fluid pressure in the upper chamber 46 is increased. This results in the workpiece 10 being forced downwardly and shaped against a forming surface 56 in the lower housing section 22 (see FIG. 3) by the relatively high fluid pressure in the upper chamber 46.

Once the plies 12 have been diffusion bonded and shaped in the manner previously described, the fluid pressure in the chamber 32 is reduced and the housing 22 is withdrawn from the autoclave 34. The tie rods 24 are removed and the housing sections 46 and 48 separated so that the workpiece 10 can be removed from the housing. The container 14 is then removed from the shaped and diffusion bonded blank 50. The blank 50 is now one piece having a configuration corresponding to the configuration of the forming surface 56 in the lower housing section 20.

Workpiece

In the specific embodiment of the invention illustrated in the drawings, the workpiece 10 is formed of plies 12 enclosed within a fluid tight container 14. The plies 12 are formed to a desired shaped and configuration corresponding to the geometry of the final article to be formed by diffusion bonding and shaping of the plies. In one specific instance, the plies 12 were formed of titanium, specifically of 0.030-inch thick Ti-6 Al-4 plies. Although it is preferred to form the plies 12 of titanium, it is contemplated that the plies could be formed of other materials, such as nickel or cobalt alloys, if desired.

After the plies 12 have been cleaned, they are positioned relative to each other and are interconnected by tack welding. The plies are then enclosed in can or container 14. In one specific instance, the can or container 14 was formed of two sheets of 0.030-inch thick titanium. However, the container 14 could be made of a nickel alloy carbon steel or material developed for superplastic forming operations, for example, IN-744, if desired. Of course, the container 14 and plies 12 could have different thicknesses and/or thicknesses other than the specific thicknesses set forth herein. In order to prevent bonding of the material of the container 14 to the plies 12, the inside of the container can be separated from the plies by carbonized foil or graphite.

The container 14 includes a generally rectangular rim 62 into which the plies 12 do not extend. The rim 62 is welded after the container 14 has been evacuated. This results in the container 14 being fluid tight so that the relatively high fluid pressure in the main chamber 32 of the autoclave 34 cannot enter the container 14. The manner in which the plies 12 are enclosed in the container 14 is generally similar to that described in U.S. Pat. No. 4,472,866.

Housing

In order to provide for sealing of the joint 28 upon heating of the housing 22, the housing is formed of components having different coefficients of thermal expansion. Thus, the upper and lower housing sections 18 and 20 are formed of a material having a relatively high coefficient of thermal expansion. In one specific instance, the housing sections 18 and 20 were formed of a nickel base super alloy.

The housing sections 18 and 20 are interconnected by bolts or tie rods 24 having a relatively low coefficient of thermal expansion. In one specific instance, the tie rods 24 were formed of a molybdenum alloy, such as TZM. The molybdenum alloy forming the tie rods 24 has a coefficient of thermal expansion which is about one-half of the coefficient of thermal expansion of the nickel super alloy forming the upper and lower housing sections 18 and 20.

Due to the relatively large coefficient of thermal expansion of the nickel alloy housing sections 18 and 20, rectangular pressure pads 64 and 66 on the upper and lower housing sections 18 and 20 are pressed firmly against the rim 62 of the container 14. The pressure pads 64 and 66 are coextensive with and have the same general configuration as the container rim 62 so that the entire rim is firmly gripped between the pressure pads. Upon heating of the housing 22, the housing sections 18 and 20 expand to a greater extent than the tie rods 24. Therefore, the pressure pads 64 and 66 are pressed firmly against the rim 62 of the container 14 to seal the joint 28.

The lower housing section 20 is provided with the forming surface 56. The forming surface 56 is smooth and free of voids. However, the forming surface 56 is disposed on a base 70 formed of fluid permeable material. Upon pressing of the workpiece 10 downwardly against the forming surface 56, fluid (gas) in the space between the lower side of the workpiece 10 and the surface 56 is forced into the fluid permeable base 70 which is connected in fluid communication with the space between the workpiece and the forming surface. Although the fluid pressure in the lower chamber remains substantially constant as the workpiece 10 is pressed against the forming surface 56, there will be a slight increase in the fluid pressure in the lower chamber due to the decrease in size of the chamber. Of course, the small increase in fluid pressure could be vented if desired.

In order to control the rate at which the workpiece 10 is formed against the surface 56, the orifice 52 controls the rate at which the fluid pressure in the upper chamber 46 increases above the fluid pressure in the lower chamber 48. Although only a single orifice 52 has been shown in the upper section 18 of the housing, it is contemplated that a plurality of orifices could be provided if desired.

While it is preferred to use the orifice 52 to control the rate at which the workpiece 10 is deflected against the shaping surface 56, this could be done by controlling the rate of increase of the fluid pressure in the autoclave chamber 32. If this was done, the orifice 52 would be eliminated and the upper housing section 18 would be provided with a relatively large opening which would allow the fluid pressure above the workpiece 10 to increase at the same rate as the fluid pressure in the main autoclave chamber 32.

It is contemplated that the fluid pressure differential necessary to shape the workpiece 10 against the forming surface 56 could be established by lowering the fluid pressure in the chamber 48. Thus, a suitable venting conduit may be connected with the lower chamber 48 and extended through the side wall of the autoclave 34 to a control valve. Upon opening of the control valve, the fluid pressure in the lower chamber 48 would be decreased from the fluid pressure necessary to bond the plies 12 together to form the blank 50. The relatively high fluid pressure in the upper chamber 46 would then be effective to force the workpiece 10 downwardly against the forming surface 56.

One Specific Shaping Method

When the workpiece 10 includes plies 12 of titanium. The fluid pressure and temperature necessary to diffusion bond the plies together to form the blank 50 is approximately 10,000 lbs. per square inch at a temperature of 1,600° F. In this specific example, the titanium plies 12 are enclosed in a titanium container 14. The sealed container 14 is placed between the upper and lower sections 18 and 20 of the housing 22 in the manner previously explained. Nuts 74 at opposite ends of the tie rods 24 are then turned finger tight with enough pressure to hold the workpiece 10 in position between the upper and lower housing sections 18 and 20. However, at this time, the force exerted by the pressure pads 64 and 66 against the rim 62 of the workpiece 10 is not sufficient to seal the joint 28.

The housing 22, with the workpiece 10 therein, is then placed in the autoclave 34. At this time, the workpiece 10 is at ambient temperature, approximately 70° F. The fluid pressure in the autoclave 34 and housing chambers 46 and 48 is ambient fluid pressure, approximately 14.7 lbs per square inch.

The fluid pressure in the main chamber 32 of the autoclave 34 is then increased to a level such that subsequent heating of the gas in the chamber 32 and housing 22 will raise the pressure to a desired value for bonding without additional pumping of fluid into the chamber. In the specific example being described, the fluid pressure in the autoclave chamber 32 was raised to 3,174 lbs per square inch. Since the joint 28 is not fluid tight, the fluid pressure in the autoclave chamber 32 flows through the joint 28 between the upper and lower pressure pads 64 and 66 and the rim 62 of the workpiece 10. Therefore, the fluid pressure in the upper and lower chambers 46 and 48 increases to the fluid pressure in the main chamber 32 of the autoclave, that is 3,174 lbs per square inch.

The temperature of the autoclave 32 and the housing 22 is then increased to 1600° F. Thus, the housing 22, workpiece 10 and the gas in the chambers 32, 46 and 48 are all heated to 1600° F.

As they are being heated, the upper and lower housing sections 18 and 20 expand to a greater extent than the tie rods 24 to seal the joint 28. Therefore, before the workpiece 10 and housing sections 18 and 20 are heated to 1600° F., the joint 28 is sealed so that fluid pressure cannot be conducted between the main chamber 32 of the autoclave and the lower housing chamber 48. However, fluid pressure can be conducted from the autoclave chamber 32 to the upper housing chamber 46 through the orifice 52.

Although fluid flow between the lower housing chamber 48 and the autoclave chamber 32 is blocked at the joint 28, the fluid pressure in the lower housing chamber rises to the same extent as the fluid pressure in the autoclave chamber. This is because the same fluid pressure, 3,174 psi, was present in both the autoclave chamber 32 and the housing chamber 48 before the heating began. Since the gas in the autoclave chamber 32 and lower housing chamber 48 are heated to the same temperature, the fluid pressures in the autoclave chamber and lower housing chamber remain equal.

When the temperature in the autoclave chamber 32 and housing chambers 46 and 48 reaches 1600° F., there will be a fluid pressure of approximately 10,000 lbs per square inch in these chambers. Since the container 14 is hermetically sealed, the fluid pressure against opposite sides of the workpiece 10 firmly presses the laminations 12 together. After the temperature of 1600° F. and pressure of 10,000 lbs per square inch has been held for a sufficient time, approximately three hours, diffusion bonding of the laminations 12 has occurred to form the unitary blank 50. Of course, the temperature, pressure and time necessary to cause diffusion bonding of the laminations 12 will vary with variations in the composition of the laminations.

After diffusion bonding of the laminations 12 has occurred, the workpiece 10 is pressed against the forming surface 56 to impart a desired configuration to the blank 50. To accomplish this, the fluid pressure in the autoclave chamber 32 is increased by opening the valve 54. In the specific process being described herein, the fluid pressure in the main chamber 32 of the autoclave is increased to 20,000 lbs per square inch while the temperature in the autoclave is maintained constant at 1600° F.

Although the fluid pressure in the main chamber 32 in the autoclave 34 is quickly increased to 20,000 lbs per square inch, the orifice 52 provides for a controlled rate of increase of the fluid pressure in the upper housing chamber 46. As the fluid pressure in the upper housing chamber 46 increases, the blank 50 is gradually pressed downwardly against the forming surface 56 and is plastically shaped to a configuration corresponding to the configuration of the forming surface. During the final stages of pressing the blank 50 against the forming surface 56, the pressure differential between the upper and lower housing chambers 46 and 48 will be approximately 10,000 lbs per square inch. Thus, the fluid pressure in the upper housing chamber 46 will be equal to the fluid pressure in the main chamber 32 of the autoclave, that is 20,000 lbs per square inch. The fluid pressure in the lower chamber 48 will remain substantially constant at 10,000 lbs per square inch.

Once the blank 50 has been shaped to the desired configuration, the fluid pressure in the main chamber 32 of the autoclave is reduced to 10,000 lbs per square inch. This results in gradual venting of the fluid pressure in the housing chamber 46 through the orifice 52 to the main chamber 32 until equal pressures are present in the housing chambers 46 and 48. Thereafter, the temperature in the main chamber 32 of the autoclave 34 is reduced to a temperature sufficient to cause a releasing of the joint 28. Once the fluid pressure in the main chamber 32 of the autoclave has been reduced to ambient fluid pressure and the components of the housing assembly 22 have cooled sufficiently so that the joint 28 is no longer fluid tight, the housing 22 can be removed from the autoclave 34. The tie rods 24 are then loosened and the shaped and bonded blank 50 is removed from the housing 22. The container 14 is then removed from the outside of the blank 50. The blank 50 may be used in its present form or subjected to further shaping operations if desired.

It should be understood that the specific temperatures, pressures and workpiece compositions set forth herein have been for purposes of clarity of disclosure and not for purposes of limiting the invention. Thus, it is contemplated that the specific temperatures and pressures will vary with variations in the composition of the workpiece. It is also contemplated that the step of pressurizing the autoclave chamber 32 before heating the gas in the autoclave chamber and housing chambers may be eliminated or that the pressure may be increased. Under certain circumstances, the housing 22 may be heated and the housing chambers 46 and 48 pressurized to shape the workpiece without using an autoclave.

Summary

In view of the foreoging description, it is apparent that the present invention provides a new and improved method of shaping a workpiece 10 to a desired configuration. The workpiece 10 is placed between sections 18 and 20 of a housing 22 having components with different coefficients of thermal expansion. A fluid tight seal is formed between the housing sections 18 and 20 and the workpiece by heating the housing 22. As the housing 22 is heated, components of the housing having different coefficients of thermal expansion cause the sections 18 and 20 of the housing to be firmly pressed against the workpiece to seal the joint 28 between the workpiece 10 and housing sections. A fluid pressure differential is then established across the workpiece to press the workpiece against a forming surface 56 having a shape corresponding to a desired shape of the workpiece.

In one specific way of practicing the invention, the housing 22, with the workpiece 10 disposed between the two sections 18 and 20 of the housing, is positioned in a main chamber 32 of an autoclave or hot isostatic pressing apparatus 34. The fluid pressure applied against opposite sides of the workpiece is increased by heating the fluid in the main chamber 32 of the autoclave 34 and the housing 22. As the housing 22 is heated, the different coefficients of thermal expansion of components of the housing cause the joint 28 between the workpiece 10 and housing sections 18 and 20 to be sealed. The fluid pressure applied against one side of the workpiece 10 is then increased by increasing the fluid pressure in the main chamber 32 of the autoclave 34 and conducting the increased fluid pressure through an orifice 52 in one of the housing sections. The workpiece 10 may be a single piece of material or a plurality of pieces of material which are bonded together under the influence of heat and pressure.

Having described a specific preferred embodiment of the invention, the following is claimed:

1. A method of bonding and shaping a plurality of pieces of material, said method comprising the steps of enclosing the plurality of pieces of material in a fluid tight container, providing a housing having a plurality of components at least some of which have different coefficients of thermal expansion, the components of the housing including a first section and a second section having a forming surface, positioning the container and housing relative to each other with the first housing section in engagement with a first side of the container and the second housing section in engagement with a second side of the container to form a joint between the housing sections and the container, enclosing the housing sections and container in a main chamber, increasing the fluid pressure in the main chamber, increasing the fluid pressure applied against opposite sides of the container from a first fluid pressure to a second fluid pressure, said step of increasing the fluid pressure applied against opposite sides of the container including increasing the fluid pressure in the main chamber from the first fluid pressure to the second fluid pressure, sealing the joint between the container and the housing sections, said step of sealing the joint between the container and the housing sections including heating the housing, expanding components of the housing having different coefficients of thermal expansion to different extents during heating of the housing, and pressing the first and second sections of the housing against the container under the influence of forces resulting from thermally expanding components of the housing to different extents, and, thereafter, pressing the second side of the container against the forming surface, said step of pressing the second side of the container against the forming surface including increasing the fluid pressure to which the first side of the container is exposed to a third fluid pressure which is greater than the second fluid pressure by increasing the fluid pressure in the main chamber to the third fluid prssure and maintaining the fluid pressure to which the second side of the container is exposed substantially constant.

2. A method as set forth in claim 1 wherein said step of sealing the joint between the container and the housing sections results in the formation of a first secondary chamber between the first housing section and the first side of the container and the formation of a second secondary chamber between the second housing section and the second side of the container, said step of increasing the fluid pressure to which the first side of the container is exposed includes conducting the third fluid pressure to the first secondary chamber from the main chamber, said step of maintaining the fluid pressure to which the second side of the container is exposed substantially constant includes maintaining the fluid pressure in the second secondary chamber at the second fluid pressure as the fluid pressure in the first secondary chamber is increased to the third fluid pressure.

3. A method of bonding and shaping a plurality of pieces of material, said method comprising the steps of enclosing the plurality of pieces of material in a fluid tight container, providing a housing having a plurality of components at least some of which have different coefficients of thermal expansion, the components of the housing including a first section and a second section having a forming surface, positioning the container and housing relative to each other with the first housing section in engagement with a first side of the container and the second housing section in engagement with a second side of the container to form a joint between the housing sections and the container, increasing the fluid pressure applied against opposite sides of the container from a first fluid pressure to a second fluid pressure by heating the fluid in the housing from a first temperature to a second temperature, said step of heating the fluid in the housing including heating the container and the plurality of pieces of material in the container, bonding the plurality of pieces of material in the container together under the influence of the heat transmitted to the pieces of material and the pressure applied against opposite sides of the container, sealing the joint between the container and the housing sections, said step of sealing the joint between the container and the housing sections including expanding components of the housing having different coefficients of thermal expansion to different extents during heating of the fluid in the housing, and pressing the first and second sections of the housing against the container under the influence of forces resulting from thermally expanding components of the housing to different extents, and, thereafter, pressing the second side of the container against the forming surface, said step of pressing the second side of the container against the forming surface including increasing the fluid pressure to which the first side of the container is exposed and maintaining the fluid pressure to which the second side of the container is exposed substantially constant.

4. A method of bonding and shaping a plurality of pieces of material, said method comprising the steps of enclosing the plurality of pieces of material in a fluid tight container having first and second outer surfaces, providing a housing having a forming surface, positioning the container and forming surface relative to each other with the first outer side surface of the container facing away from the forming surface and the second outer side surface of the container facing toward the forming surface, enclosing the housing and container in a main chamber, increasing the fluid pressure in the main chamber and the fluid pressure applied against the first and second outer side surfaces of the container from a first fluid pressure to a second fluid pressure, heating the container and pieces of material therein from a first temperature to a second temperature, bonding the pieces of material in the container together under the influence of heat transmitted through the container and the second fluid pressure applied against the first and second outer side surfaces of the container, and, thereafter, changing the configuration of the container and pieces of material by pressing the second outer side surface of the container against the forming surface with a force sufficient to deform the container and pieces of material, said step of pressing the second outer side surface of the container against the forming surface including increasing the fluid pressure to which the first outer side surface of the container is exposed to a third fluid pressure which is greater than the second fluid pressure by increasing the fluid pressure in the main chamber to the third fluid pressure and maintaining the fluid pressure to which the second outer side surface of the container is exposed substantially constant at the second fluid pressure.

5. A method as set forth in claim 4 further including the step of sealing a joint between the container and the housing to form a first secondary chamber between the housing and the first outer side surface of the container and to form a second secondary chamber between the housing and the second outer side surface of the container, said step of increasing the fluid pressure to which the first outer side surface of the container is exposed includes conducting the third fluid pressure to the first secondary chamber from the main chamber, said step of maintaining the fluid pressure to which the second outer side surface of the container is exposed substantially constant includes maintaining the fluid pressure in the second secondary chamber at the second fluid pressure as the fluid pressure in the first secondary chamber is increased to the third fluid pressure.

6. A method as set forth in claim 5 wherein said step of providing a housing includes providing a housing having a plurality of components at least some of which have different coefficients of thermal expansion, said step of sealing the joint between the container and the housing includes heating the housing, expanding components of the housing having different coefficients of thermal expansion to different extends during heating of the housing, and pressing the housing against the container under the influence of forces resulting from thermally expanding components of the housing to different extents.

* * * * *